United States Patent
Kim (10) Patent No.: US 7,518,668 B2
(45) Date of Patent: Apr. 14, 2009

(54) DISPLAY DEVICE HAVING HORIZONTAL POWER TRANSFORMER CONFIGURATION

(75) Inventor: Gi Bin Kim, Siheung (KR)

(73) Assignee: LG Display Co., Ltd., Seoul (KR)

( * ) Notice: Subject to any disclaimer, the term of this patent is extended or adjusted under 35 U.S.C. 154(b) by 232 days.

(21) Appl. No.: 10/964,773

(22) Filed: Oct. 15, 2004

(65) Prior Publication Data

US 2005/0243260 A1 Nov. 3, 2005

(30) Foreign Application Priority Data

Apr. 30, 2004 (KR) ...................... 10-2004-0030626

(51) Int. Cl.
*G02F 1/1335* (2006.01)
(52) U.S. Cl. ............................. 349/57; 349/58; 349/62; 349/65; 349/149; 345/102
(58) Field of Classification Search ................ 345/102; 349/57, 58, 62, 65, 69, 149; 361/693, 690, 361/688, 696, 697, 694, 713, 712, 704, 707, 361/709
See application file for complete search history.

(56) References Cited

U.S. PATENT DOCUMENTS

2004/0051692 A1 * 3/2004 Hirakata et al. ............. 345/102
2004/0113883 A1 * 6/2004 Kim et al. ................... 345/102
2004/0246226 A1 * 12/2004 Moon .......................... 345/102
2006/0267918 A1 * 11/2006 Kim ............................ 345/102

FOREIGN PATENT DOCUMENTS

JP 2004-095377 3/2004

* cited by examiner

*Primary Examiner*—Tuyet Vo
(74) *Attorney, Agent, or Firm*—McKenna Long & Aldridge LLP (57) ABSTRACT

The present invention provides a backlight unit and liquid crystal display device having the same, by which cooling performance is prevented from being lowered in a manner of arranging inverter elements in a horizontal direction. The present invention includes a lamp unit comprising a plurality of light-emitting lamps wherein electrodes are provided to both ends of each of the light-emitting lamps and an inverter provided to a rear side of the lamp unit in a horizontal direction to apply power to a plurality of the light-emitting lamps. And, the inverter includes at least one inverter printed circuit board arranged on a lower part of the rear side of the lamp unit in the horizontal direction and a plurality of transformers and inverter elements arranged on the at least one inverter printed circuit board in the horizontal direction.

3 Claims, 9 Drawing Sheets

DISPLAY DEVICE HAVING HORIZONTAL POWER TRANSFORMER CONFIGURATION

This application claims the benefit of the Korean Application No. P2004-30626 filed on Apr. 30, 2004, which is hereby incorporated by reference for all purposes as if fully set forth herein.

BACKGROUND OF THE INVENTION

1. Field of the Invention

The present invention relates to a backlight unit, and more particularly, to a backlight unit and display device having the same, in which an inverter arrangement is modified to prevent problems caused by degradation of heat-radiation capability.

2. Discussion of the Related Art

Generally, a cathode ray tube (CRT), one of various display devices, has been used as a monitor of a measuring equipment, information terminals, or the like as well as television sets. Yet, large size and heavy weight of the CRT fail to meet the demand for compactness and lightweight of electronic products.

There are limitations on the weight and size of the CRT, which is contrary to the trend of compactness and lightweight of various electronic products. Hence, there are various display devices expected to replace the CRT such as LCD (liquid crystal display) using optical electric field effect, PDP (plasma display panel) using gas discharge, ELD (electroluminescent display) using electroluminescence, and the like. Specifically, many efforts to research and develop the LCD are underway.

In order to replace the CRT, the LCD, which is advantageous in compact/slim size, lightweight, low power consumption, and the like, has been widely researched and developed. The LCD has been developed enough to be used in a flat panel display and is adopted as a monitor of a desktop computer, a wide information display device, and the like, as well as laptop computers. Hence, the demand for the LCD keeps rising.

The LCD is mostly a light-receiving device that displays an image by controlling an external incident light, thereby needing a separate light source for applying a light to an LCD panel, i.e., a backlight unit.

Generally, a backlight unit used as a light source of LCD, in which cylindrical fluorescent lamps are arranged, is categorized into an edge-light type and a direct-light type.

First of all, in the edge-light type backlight unit, a lamp unit is provided to one side of a light-guide plate. The lamp unit consists of a lamp emitting light, a lamp holder inserted in both ends of the lamp to protect the lamp, and a lamp reflector enclosing an outer circumference of the lamp to have one side fitted in a lateral side of the light guide plate to reflect the light emitted from the lamp toward the light guide plate.

The edge-light type backlight unit having the lamp unit provided to one side of the light guide plate is mainly applicable to a small-size LCD, such as a laptop computer, a desktop computer, and the like. Hence, the edge-light type backlight unit provides excellent light uniformity, long endurance, and advantage of slimness of LCD.

The direct-light type backlight unit, which has been developed to cope with a wide-screen display over 20 inches, includes a plurality of lamps in one line on a lower side of a diffusing plate to directly illuminate a front side of an LCD panel.

The direct-light type backlight unit has light efficiency higher than that of the edge-light type backlight unit. Thus, the direct-light type backlight has been widely adopted for wide-screen LCDs requiring high brightness.

However, a drive time of the LCD using the direct-light type backlight unit, which is used for a wide-screen monitor, TV set, and the like, is generally longer than that of the LCD for a laptop computer. The number of lamps used in the direct-light type backlight unit is greater than that of the edge-light type backlight unit. Hence, it is highly probable that the lamps of the direct-light type LCD fail to be turned on more easily that those of the edge-light type LCD.

EL (electroluminescence), LED (light-emitting diode), CCFL (cold cathode fluorescent lamp), HCFL (hot cathode fluorescent lamp), EEFL (external electrode fluorescent lamp), or the like can be used as a light source of the edge-light or direct-light type LCD.

A direct-light type backlight unit according to a related art is explained as follows.

Figure 1:
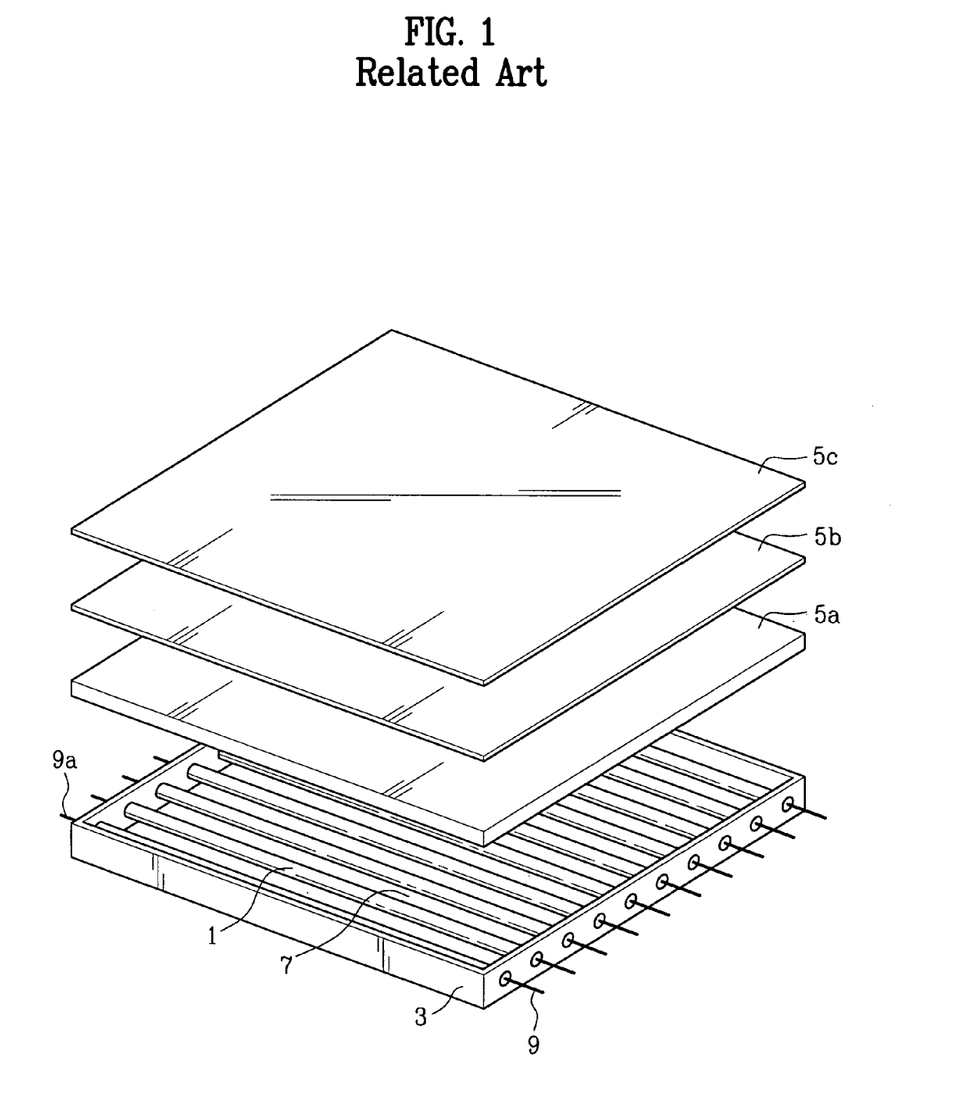
FIG. 1 is a perspective diagram of a direct-light type backlight unit according to a related art.
Figure 2:
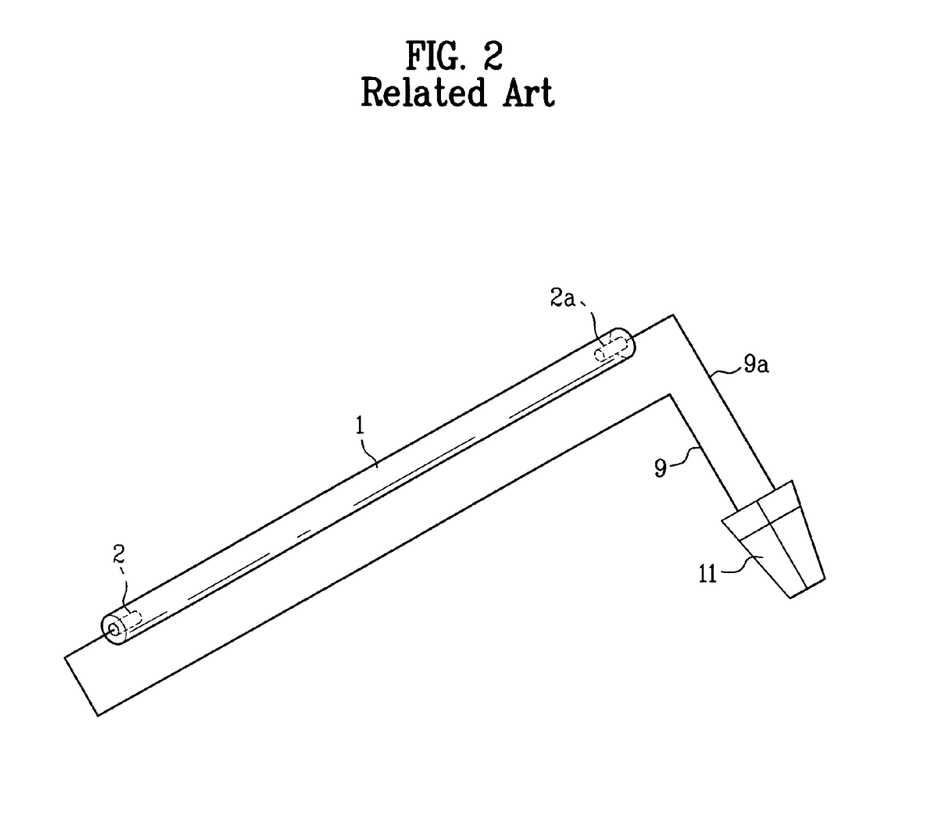
FIG. 2 is a perspective diagram of power drop wires connected to a light-emitting lamp and connector.

FIG. 1 is a perspective diagram of a direct-light type backlight unit according to a related art, and FIG. 2 is a perspective diagram of power drop wires connected to a light-emitting lamp and connector.

Referring to FIG. 1, a direct-light type backlight unit according to a related art consists of a plurality of light-emitting lamps 1, an outer case 3 to support the light-emitting lamps 1, and a plurality of light-diffusion means 5a, 5b, and 5c provided between a liquid crystal display panel (not shown in the drawing) and the light-emitting lamps 1.

The light-diffusion means 5a, 5b, and 5c prevent the shape of the light-emitting lamps 1 from appearing on a display surface of the liquid crystal display panel and provide a light source having a uniform luminosity overall. In order to enhance a light-diffusion effect, a plurality of diffusion sheets and plates are arranged between the liquid crystal display panel and the light-emitting lamps 1.

A reflector 7 is provided to an inside of the outer case 3 to condense the light emitted from the light-emitting lamps 1 on a display part of the liquid crystal display panel. This is to maximize efficiency of light use.

Each of the light-emitting lamps 1, as illustrated in FIG. 1, consists of a cold cathode fluorescent lamp (CCFL). Electrodes 2 and 2a are provided to respective ends of a tube. When power is applied to the electrodes 2 and 2a, the corresponding light-emitting lamp 1 emits light. Respective ends of the light-emitting lamp 1 are fitted in holes formed at both sides of the outer case 3.

Power drop wires 9 and 9a for transferring power for driving the corresponding lamp are connected to the electrodes 2 and 2a of the light-emitting lamp 1, respectively. The power drop wires 9 and 9a are connected to a separate connector 11 to be connected to a driver circuit (not shown). Hence, the connector 11 should be provided to each of the light-emitting lamps 1.

Namely, one power drop wire 9 connected to one electrode 2 of the light-emitting lamp 1 and the other power drop wire 9a connected to the other electrode 2a of the light-emitting lamp 1 are connected to one connector 11 as illustrated in FIG. 2. One of the power drop wires 9 and 9a is bent toward a rear side of the outer case 3 to be connected to the connector 11.

However, in the related art backlight unit of the liquid crystal display device, the connector 11 is connected to the power drop wires 9, 9a of the light-emitting lamp to be connected to the driver circuit (not shown). The connector 11 should be individually provided to each of a plurality of the light-emitting lamps, which can result in complicated wiring. The power drop wires are bent to be connected to the connector 11 to reduce the thickness of the backlight unit, causing reduced work efficiency. Moreover, the wire-bending process should be carried out separately, increasing processing time to lower productivity.

Besides, perforated holes should be provided to the outer case to connect the electrodes to the connector and both of the electrodes should be fitted in the corresponding perforated holes to be externally exposed. Hence, work efficiency is lowered and maintenance and repair of the light-emitting lamps are difficult.

A direct-light type backlight unit according to another related art is explained as follows.

Figure 3:
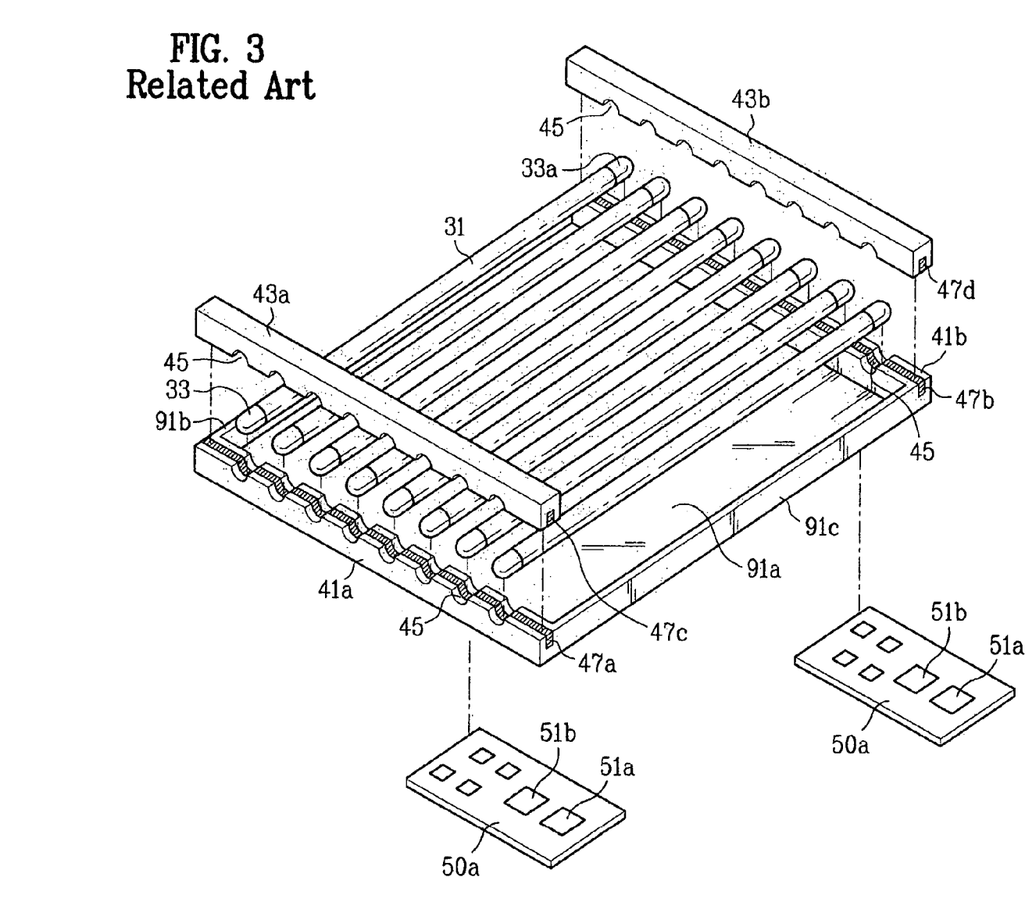
FIG. 3 is a perspective diagram of a direct-light type backlight unit according to another related art.
Figure 4:
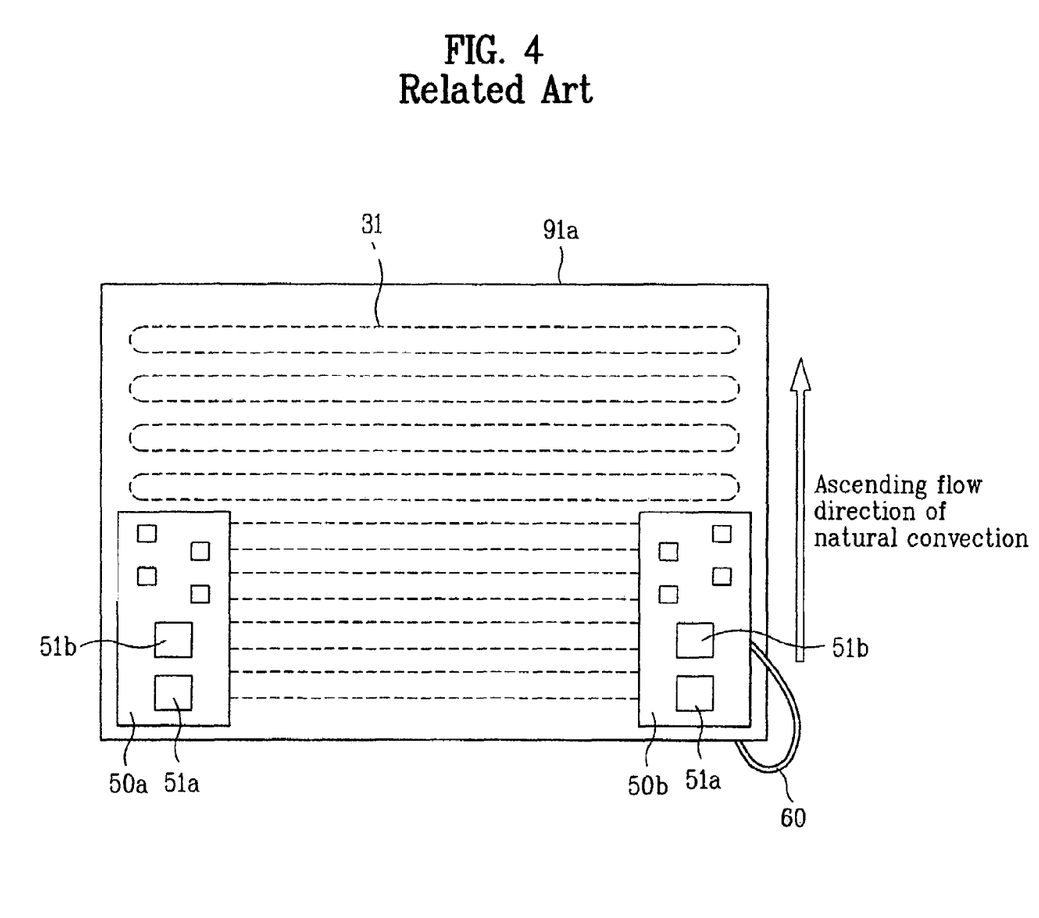
FIG. 4 is a layout of inverters arranged on a rear side of the direct-light type backlight unit according to another related art.

FIG. 3 is a perspective diagram of a direct-light type backlight unit according to another related art, and FIG. 4 illustrates a layout of inverters arranged on a rear side of the direct-light type backlight unit according to another related art.

Referring to FIG. 3, a direct-light type backlight unit according to another related art consists of a plurality of light-emitting lamps 31, each having electrodes 33 and 33a at respective outside ends of a corresponding tube, first and second lower structures 41a and 41b arranged having a distance from each other to fit each length of the light-emitting lamps 31; the first and second lower structures 41a and 41b each having a plurality of recesses 45 at one side to hold both ends of a plurality of the light-emitting lamps 31, respectively; lower supports 91a, 91b, and 91c provided to a space defined between the first and second lower structures 41a and 41b and both sides of the defined space to support the first and second lower structures 41a and 41b; first and second upper structures 43a and 43b provided to leave the same distance between the first and second lower structures 41a and 41b to support the light-emitting lamps 31 together with the first and second lower structures 41a and 41b, the first and second upper structures 43a and 43b having a plurality of recesses 45 corresponding to the recesses of the first and second lower structures 41a and 41b at one sides, respectively; and conductive layers 47a, 47b, 47c, and 47d formed in one direction along the sides of the first and second lower and upper structures 41a, 41b, 43a, and 43b to apply power to the light-emitting lamps 31, respectively.

In order to apply the power to the electrodes at both of the ends of the light-emitting lamps 31, first and second power transform units 50a and 50b are provided to both sides of a rear side of the lower support 91a to have a vertical configuration each. Transformers 51a and 51b are sequentially arranged in a height direction at lower sides on the first and second power transform units 50a and 50b, respectively. Various inverter elements are located on their peripheries.

Generally, at least two light-emitting lamps can be connected to one transformer to be driven. In FIG. 3 and FIG. 4, four light-emitting lamps are connected to one transformer to be driven for example, for which two transformers 51a and another two transformers 51b are provided to both lateral sides of the rear side of the lower support 91a, respectively.

Generally, power transform unit provides current and voltage for a light-emitting lamp drive and converts DC to AC. During such an operation, heat is mostly produced from the transformers 51a and 51b among the inverter elements.

As mentioned in the above description, the transformers 51a and 51b produce most of the heat from the power transform unit. If the transformers are sequentially arranged on the lower side of the power transform unit in a vertical direction, air in the lower side ascends upward by natural convection. The air heated by the heat generating transformers 51a and 51b naturally ascends to heat the inverter elements located on the upper side, thereby extremely lowering the inverter cooling performance.

Moreover, one transformer 51b arranged above the other transformer 51a is more heated by the ascending hot air to raise its temperature higher than that of the other transformer 51a, whereby the corresponding cooling performance is further degraded.

If the current of the light-emitting lamp, which is related to the thermal load of the inverter, is increased, the cooling performance of the inverter becomes worse.

Although not illustrated in the drawing, when a cover shield for inverter protection is further provided, the inverter cooling performance is further degraded by raising temperatures of the inverter elements over the rated temperature, thereby lowering operational reliance of the inverter.

SUMMARY OF THE INVENTION

Accordingly, the present invention is directed to a backlight unit and a display device having the same that substantially obviate one or more problems due to limitations and disadvantages of the related art.

An advantage of the present invention is to provide a backlight unit and liquid crystal display device having the same, by which cooling performance is prevented from being lowered in a manner of arranging an inverter in a horizontal direction.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, a liquid crystal display device includes a liquid crystal panel assembly having a front side and a rear side; and a power transform unit at a bottom of the rear side of the liquid crystal panel assembly, the power transform unit including at least two heat generating electronic components arranged to be offset from one another with respect to a vertical direction.

The liquid crystal display device may include a backlight unit at the rear side of the liquid crystal panel assembly. The backlight may include a plurality of light emitting lamps The heat generating electronic components may include at least one inverter having an FET and a transformer. The heat generating electronic components may include at least two inverters.

In one aspect of the present invention, the liquid crystal display device further includes a backlight unit.

A reflector formed of a synthetic resin having excellent light reflectivity or a separate reflective coating may be provided to insides of the first and second lower structures and the lower supports.

A light diffusion means comprising a diffusion plate and a diffusion sheet may be further provided over the lamp unit.

In another aspect of the present invention, a liquid crystal display device includes a liquid crystal display panel assembly, a backlight unit under the liquid crystal display panel assembly, the backlight unit including a lamp unit comprising a plurality of light-emitting lamps wherein electrodes are provided to both ends of each of the light-emitting lamps and a power transform unit provided to a rear side of the lamp unit to apply power to a plurality of the light-emitting lamps, wherein components of the power transform unit are offset from one another with respect to a vertical direction; a top chassis on the liquid crystal display panel assembly; and a medium chassis beneath the liquid crystal display panel assembly.

At least two of the components may be arranged horizontally with respect to one another.

The power transform unit may include at least one inverter printed circuit board arranged on a lower part of the rear side of the lamp unit in the horizontal direction and a plurality of transformers and inverter elements arranged on the at least one inverter printed circuit board in the horizontal direction.

The lamp unit may include first and second lower structures arranged to leave a predetermined distance from each other to fit each length of the light-emitting lamps, the first and second lower structures having a plurality of first recesses at each side to hold respective ends of a plurality of the light-emitting lamps; lower supports provided to a space defined between the first and second lower structures and both sides of the defined space to support the first and second lower structures; first and second upper structures provided to leave the predetermined distance between the first and second lower structures to fix to support the light-emitting lamps together with the first and second lower structures, the first and second upper structures having a plurality of second recesses corresponding to the first recesses of the first and second lower structures at each side, respectively; and common electrodes formed on the recess-formed sides of the first and second lower and upper structures, respectively; wherein each of the plurality of light-emitting lamps have electrodes at respective outside ends of a corresponding tube.

The liquid crystal display device may further include at least one wire connecting the power transform unit and common electrodes to supply power to the light emitting lamps.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Figure 5A:
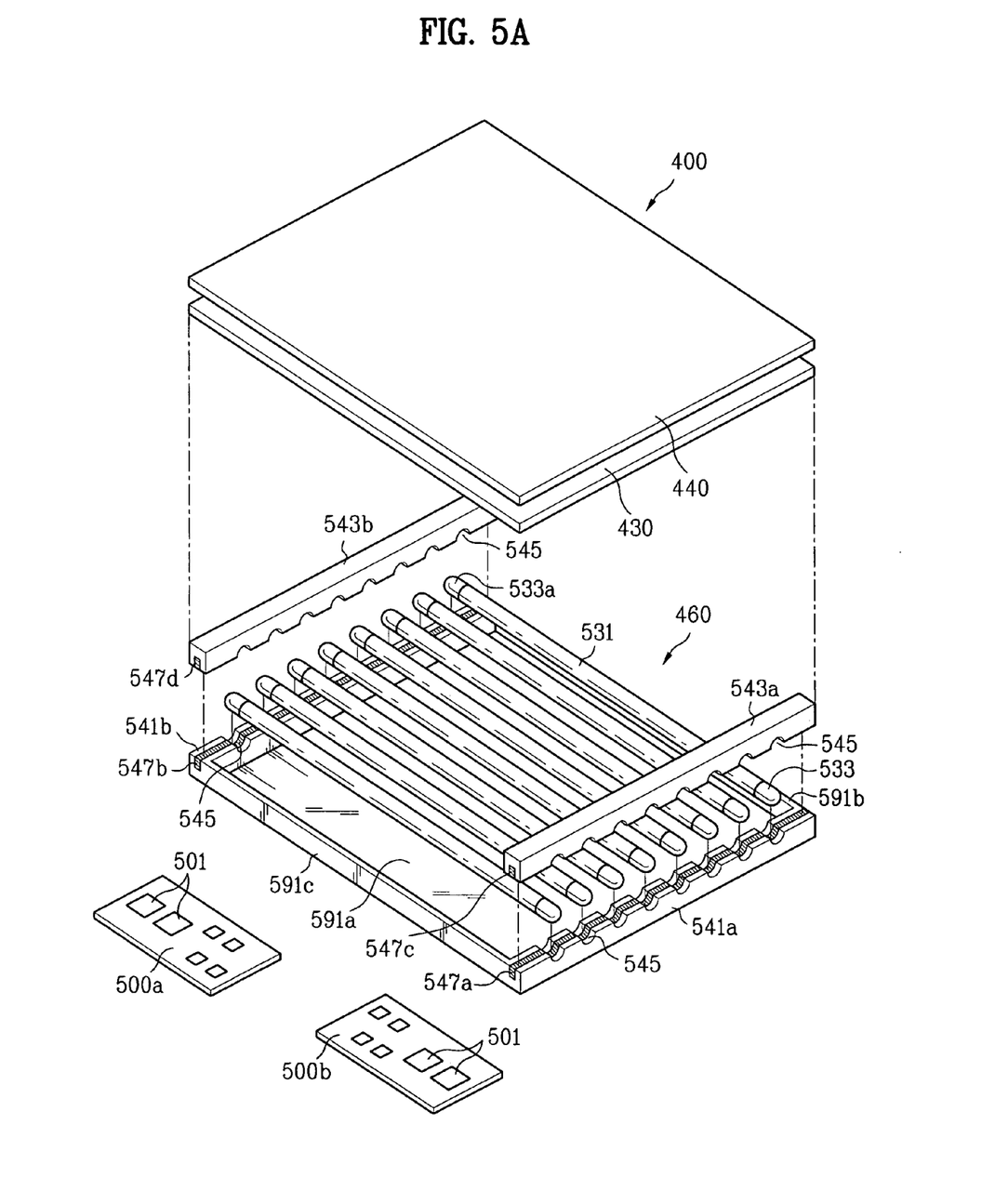
FIG. 5A and FIG. 5B are projected perspective diagrams of a direct-light type backlight unit and liquid crystal display device having the same according to the present invention.
Figure 5B:
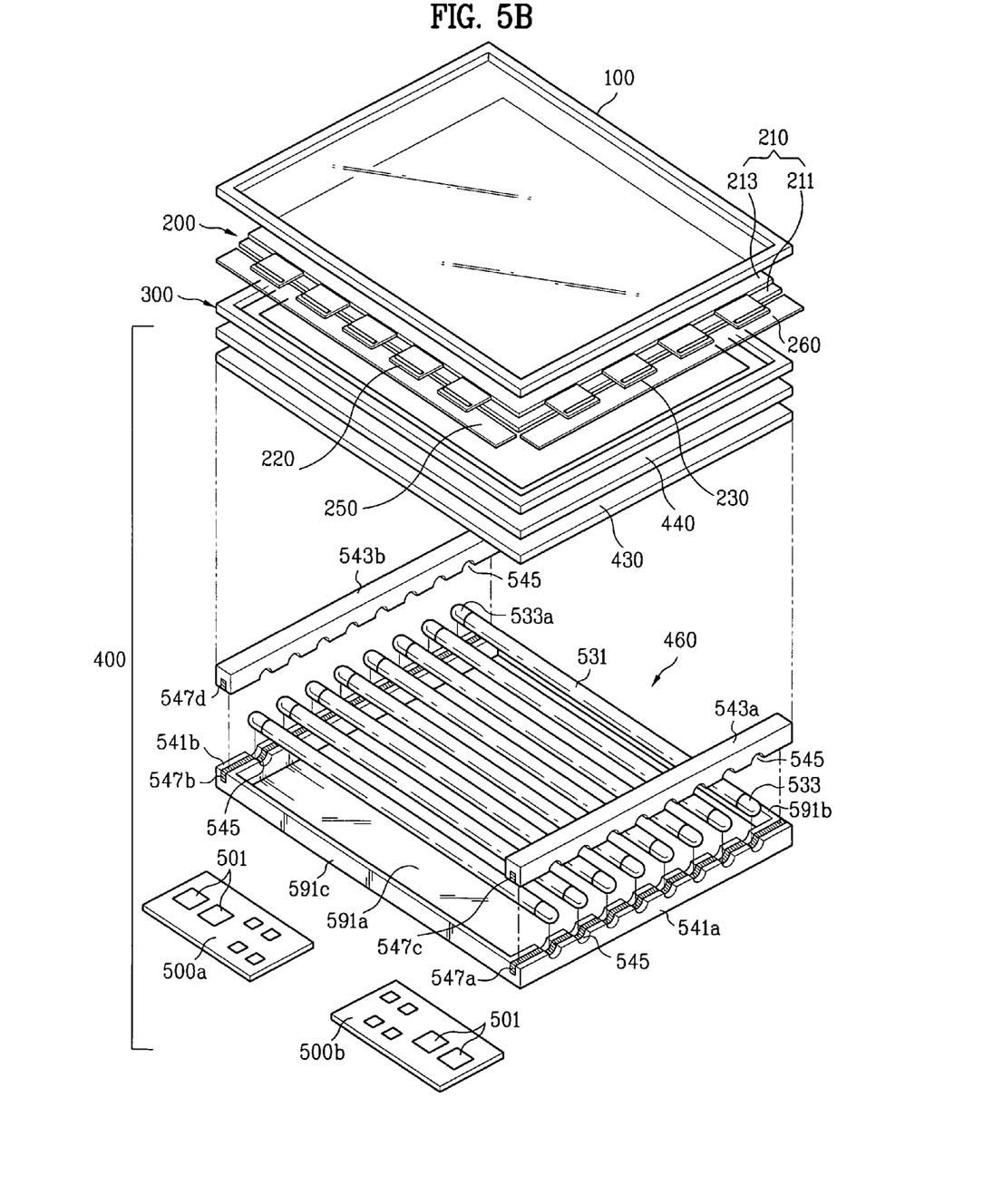
Figure 6:
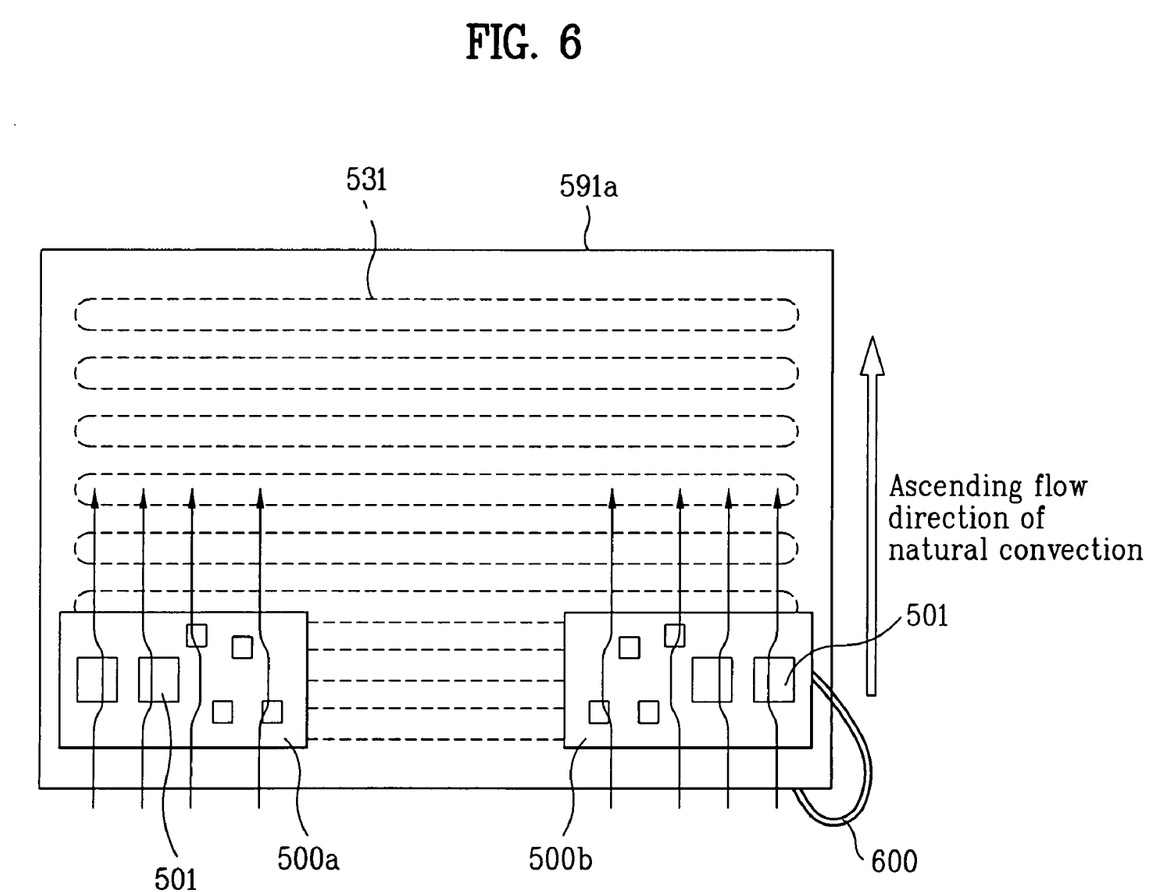
FIG. 6 is a layout of inverters arranged on a rear side of the direct-light type backlight unit according to the present invention.

FIG. 5A and FIG. 5B are projected perspective diagrams of a direct-light type backlight unit and liquid crystal display device having the same according to the present invention, and FIG. 6 is a layout of inverters arranged on a rear side of the direct-light type backlight unit according to the present invention.

A backlight unit 400 according to one embodiment of the present invention, as illustrated in FIG. 5A and FIG. 6, includes a diffusion plate 430, a diffusion sheet 440, a lamp unit 460, and an inverter for supplying power to the lamp unit 460.

The diffusion plate 430 and diffusion sheet 440 are light-diffusion means for providing a light source having uniform luminosity overall and for preventing a shape of light-emitting lamp(s) from appearing on a display surface of a liquid crystal display panel. In order to enhance a light diffusion effect, the diffusion plate 430 and diffusion sheet 440 are provided between a liquid crystal display panel 210 in FIG. 5 and the lamp unit 460.

The lamp unit 460 includes a plurality of light-emitting lamps 531, each having electrodes 533 and 533a at respective outside ends of a corresponding tube, first and second lower structures 541a and 541b arranged to leave a predetermined distance 'L' from each other to fit each length of the light-emitting lamps 531, the first and second lower structures 541a and 541b having a plurality of recesses 545 at one side to hold both ends of a plurality of the light-emitting lamps 531, respectively, lower supports 591a, 591b, and 591c provided to a space defined between the first and second lower structures 541a and 541b and both sides of the defined space to support the first and second lower structures 541a and 541b, first and second upper structures 543a and 543b provided to leave the same distance 'L' between the first and second lower structures 541a and 541b to fix to support the light-emitting lamps 31 together with the first and second lower structures 541a and 541b, the first and second upper structures 543a and 543b having a plurality of recesses 45 corresponding to the recesses of the first and second lower structures 541a and 541b at one side, respectively, and common electrodes 547a, 547b, 547c, and 547d formed on the recess-formed sides of the first and second lower and upper structures 541a, 541b, 543a, and 543b to apply power to the light-emitting lamps 531, respectively.

Moreover, in order to condense the light emitted from the light-emitting lamps on the liquid crystal display panel, insides of the first and second lower structures 541a and 541b and insides of the lower supports 591a, 591b, and 591c are formed of a material having excellent light-reflective capability such as synthetic resin, thereby acting as a reflector. Alternatively, a separate reflective material can be coated on the insides of the first and second lower structures 541a and 541b and lower supports 591a, 591b, and 591c.

Besides, the first and second lower structures 541a and 541b can be configured to be detachable from each other to leave a predetermined distance from each other.

An inverter for applying power to the lamp unit 460 includes first and second power transform units/devices 500a and 500b arranged on a lower rear side of the lamp unit 460 in a horizontal direction. More particularly, a plurality of transformers 501 are arranged to be offset from one another with respect to a vertical direction on the first and second power transform units 500a and 500b, which are arranged horizontally with respect to one another on respective lower parts of a rear side of the lower support 591a, respectively, and a plurality of inverter elements, such as a field effect transistor (FET).

Wires 600 are connected between the first power transform unit 500a and the common electrode 547a and between the second power transform unit 500b and the common electrode 547c, respectively to apply power to electrodes on both ends of a plurality of the light-emitting lamps 531.

Thus, each of the wires 600, which connects the first power transform unit 500a to the common electrode 547a or the second power transform unit 500b to the common electrode 547c, is not affected by a length of the corresponding power transform unit regardless of the vertical or horizontal arrangement of the power transform unit. Hence, there is no problem in designing the arrangements of the power transform units.

Each of the light-emitting lamps 531 includes an external electrode fluorescent lamp (EEFL) having the electrodes 533 and 533a formed on both of the ends of its tube, respectively.

At least two of the light-emitting lamps 531 are connected to one transformer to be driven.

If the at least two light-emitting lamps 531 connected to one transformer are driven, a load is excessively put on the transformer so that the temperature of the transformer may rise.

The present invention relates to a horizontal or vertically-offset transformer arrangement to minimize the temperature rise of the inverter or transformer elements by removing thermal interference of the heat generating transformer. The reason for arranging the first and second power transform units 500a and 500b on the lower rear side of the lamp unit 460 horizontally or vertically offset and the reason of arranging the transformers 501 and inverter elements on the first and second power transform units 500a and 500b offset with a respect to a vertical direction are explained in the following.

First of all, the first and second power transform units 500a and 500b are horizontally arranged on the lower rear side of the lamp unit 460. This is to prevent the temperature rise of the first and second power transform units 500a and 500b. If the first and second power transform units 500a and 500b are arranged to have the related art vertical configuration on the rear side corresponding to the electrodes at both of the ends of the light-emitting lamp 31, the temperature rise of the first and second power transform units 500a and 500b is accelerated as the electrodes at both of the ends of the light-emitting lamp are heated.

Secondly, the transformers 501 and inverter elements, such as FETs, may be horizontally arranged or arranged to be offset from one another with respect to a vertical direction on the first and second power transform units 500a and 500b. This is to prevent the temperature rise of the transformers 501 and inverter elements, which each independently release heat, even if an ascending flow of natural convection occurs by the heated transformers 501 or inverter elements.

Thus, if the first and second power transform units 500a and 500b and transformers 501 are offset from one another with respect to a vertical direction, the heat can be efficiently released.

A simulation result of the temperatures of the transformers and inverter elements according to the inverter arrangement configuration of the present invention is compared to that of the related art as follows.

Figure 7A:
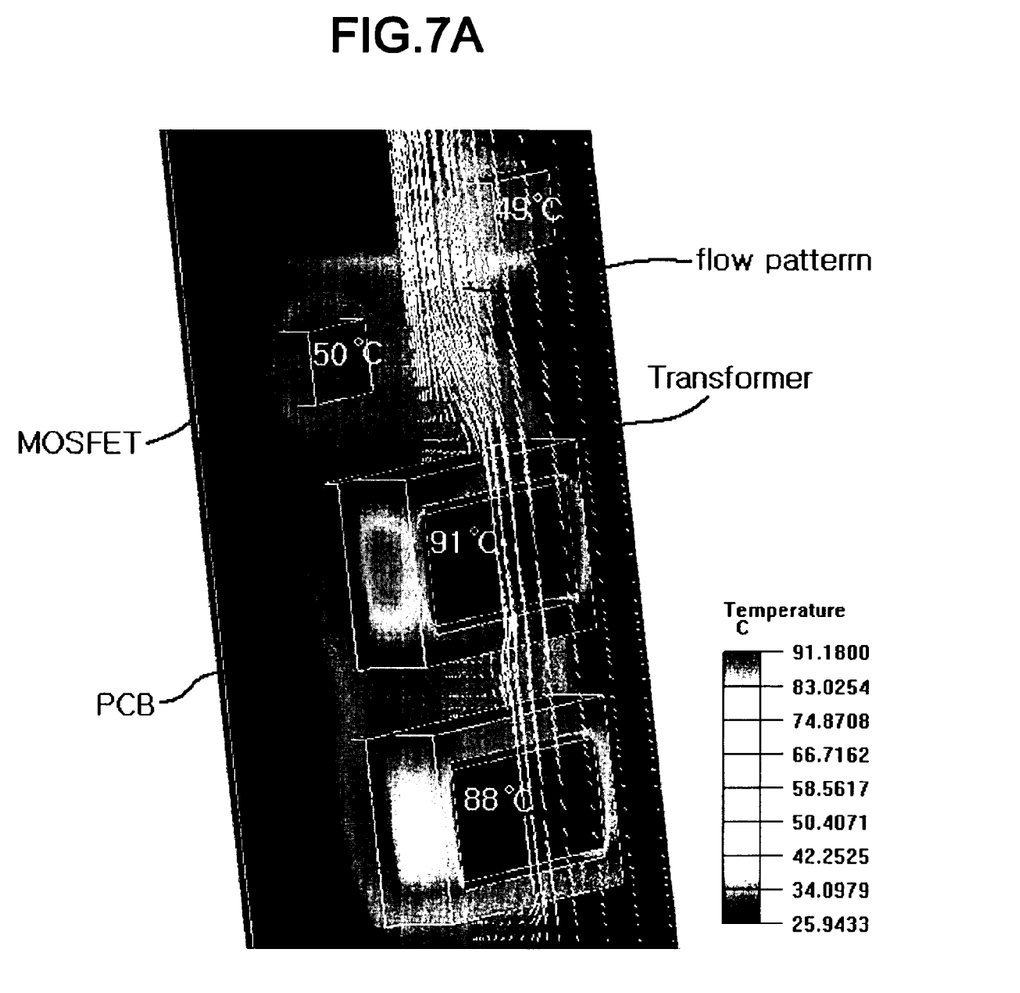
FIG. 7A and FIG. 7B are diagrams of simulated temperature distribution according to an inverter arrangement according to the related art and the present invention, respectively.
Figure 7B:
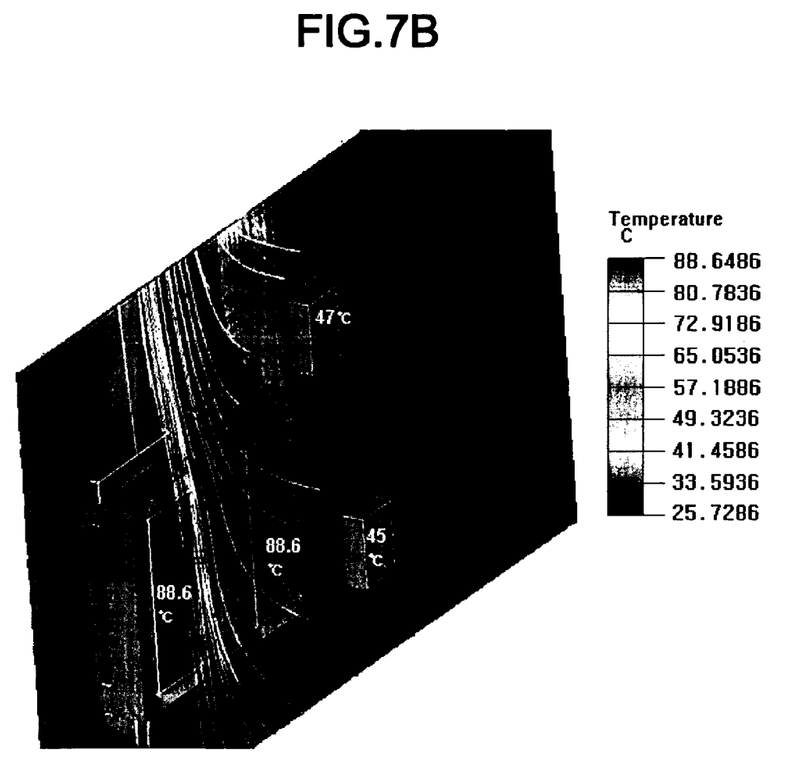

FIG. 7A and FIG. 7B are diagrams of simulated temperature distribution according to an inverter arrangement according to the related art and the present invention, respectively, in which the simulation is carried out at the room temperature of about 25° C. and the inverter has about 95% transformation efficiency.

Referring to FIG. 7A, the temperatures of the respective transformers and inverter elements of the related art having the vertically arranged inverter are measured. When the transformers are vertically arranged on the power transform unit, the temperatures of the lower and upper transformers are measured 88° C. and 91° C., respectively. Namely, in case that the transformers are vertically arranged, the temperature of the upper transformer is measured higher than that of the lower transformer due to the ascending flow of natural convection. The temperatures of the inverter elements arranged above the transformers are measured 50° C. and 49° C., respectively.

Referring to FIG. 7B, the temperatures of the respective transformers and inverter elements of the present invention having the horizontally arranged inverter are measured. The transformers horizontally arranged on the power transform unit have the same temperature of 88.6° C. overall. And, the temperatures of the inverter elements arranged above the transformers are measured 45° C. and 47° C., lower than those of the related art, respectively.

Since the transformers and inverter elements are horizontally arranged within the inverter arranged in the horizontal direction, heat is independently released by the present invention without affecting the neighbor transformer despite the ascending flow of natural convection.

A contact between the inverter elements and the air heated by the transformers is minimized to inhibit the temperature rise of the inverter.

A liquid crystal display device having the above-featured backlight unit according to the present invention, as illustrated in FIG. 5B, includes a medium chassis 300, liquid crystal display panel 200, and top chassis 100 stacked on the backlight unit 400 in turn.

The top and medium chassis 100 and 300 are provided onto and beneath the liquid crystal display panel assembly 200, respectively, to couple and protect the liquid crystal display panel assembly 200.

The liquid crystal display panel assembly 200 includes a liquid crystal display panel 210 and driver circuit devices 250, 260, 220, and 230.

The liquid crystal display panel 210 includes a TFT substrate 211, a color filter substrate 213, and a liquid crystal layer (not shown in the drawing) between the substrates 211 and 213.

The TFT substrate 211 includes thin film transistors, gate lines, data lines, and pixel electrodes.

The color filter substrate 213 is overlapped on the TFT substrate 211. The color filter substrate 213 includes a transparent substrate, R/G/B pixels on the transparent substrate, and a common electrode traversing the transparent substrate overall. The R/G/B pixels are formed to confront the pixel electrodes on the TFT substrate 211, respectively.

The TFT and color filter substrates 211 and 213 are assembled to each other in a manner of aligning the pixel electrodes and R/G/B pixels with each other and providing liquid crystals between the substrates 211 and 213, thereby completing the liquid crystal display panel 210.

In the above-configured liquid crystal display panel 210, by applying a gate signal to the corresponding gate line while data signals are individually applied to the entire data lines, the thin film transistor belonging to a row having the gate signal applied thereto among the matrix type thin film transistors is turned on so that power corresponding to the data signal is applied to the pixel electrode connected to the turned-on thin film transistor. When the power is applied to the pixel electrode, an electric field variation occurs between the pixel electrode and the common electrode so that alignment of liquid crystals is changed to correspond to the electric field variation. In doing so, light transmissible via the liquid crystals is passed through the liquid crystals and R/G/B pixel to produce a predetermined color.

Such a process is repeated during one frame to display a specific image. In order to implement the image display, a gate PCB 260 is provided to the gate lines via gate flexible printed circuit 230 and a data PCB 250 is provided to the data lines via data flexible printed circuit 220.

The gate flexible printed circuit 230, gate PCB 260, data flexible printed circuit 220, and data PCB 250 construct the driver circuit device.

In the above-configured liquid crystal display device, since the backlight unit including the power transform units arranged in the horizontal direction or offset from each other with respect to a vertical direction and the transformers and inverter elements horizontally arranged in the corresponding power transform unit each to independently release heat, as described with reference to FIG. 5A and FIG. 6, is provided under the top chassis 100, liquid crystal display panel assembly 200, and medium chassis 300, the temperature rise can be prevented from being accelerated despite the heated transformers of the inverter. It is also possible to prevent the temperature of the liquid crystal display device from rising.

Accordingly, a backlight unit and liquid crystal display device having the same according to the present invention has the following effects or advantages.

First of all, by arranging the transformers 501 on the first and second inverter PCBs 500a and 500b horizontally, the transformers 501 and inverter elements enable to independently release heat despite the occurrence of the ascending flow of natural convection. Therefore, the present invention prevents the temperature rise from being accelerated.

Secondly, the first and second power transform units 500a and 500b are horizontally provided to the lower rear side of the lamp unit 460, whereby the temperature rise of the first and second inverter PCBs 500a and 500b from being accelerated when the electrodes of the light-emitting lamps are heated. Therefore, the present invention provides improved operational reliance of the inverter and solves the related art problem of the increasing tube current of the light-emitting lamp due to the inverter temperature rise.

Finally, the present invention prevents the acceleration of the inverter temperature rise, thereby enabling to enhance top-to-bottom and right-to-left temperature uniformities.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A backlight unit, comprising:
 a lamp unit comprising a plurality of light-emitting lamps wherein electrodes are provided to respective ends of each of the light-emitting lamps; and
 an inverter provided to a rear side of the lamp unit to apply power to a plurality of the light-emitting lamps,
 wherein the inverter comprising:
 at least one inverter printed circuit board arranged on a lower part of the rear side of the lamp unit in a direction vertical to the convection flow direction and having long-sides parallel to the longitudinal direction of the light-emitting lamps and short-sides parallel to the convection flow direction; and
 a plurality of transformers and inverter elements offset from one another with respect to a convection flow direction vertical to the longitudinal direction of the light-emitting lamps in the backlight unit, arranged on the at least one inverter printed circuit board in a direction vertical to the convection flow direction and arranged in at least of a single row along the direction vertical to the convection flow direction to independently release heat despite the occurrence of the ascending convection flow, thereby preventing a temperature rise from being accelerated.

2. The backlight unit of claim 1, wherein the plurality of transformers include first and second transformers.

3. The backlight unit according to claim 2, wherein the first and second transformers do not overlap with each other in the convection flow direction.

* * * * *